United States Patent
Papiernik et al.

(10) Patent No.: US 6,806,676 B2
(45) Date of Patent: Oct. 19, 2004

(54) METHOD FOR MAXIMIZING POWER OUTPUT IN PERMANENT FIELD SYNCHRONOUS MOTORS

(75) Inventors: Wolfgang Papiernik, Neunkirchen (DE); Klaus Georg, Salz (DE); Stefan Kuenzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 10/303,404

(22) Filed: Nov. 25, 2002

(65) Prior Publication Data

US 2004/0008004 A1 Jan. 15, 2004

Related U.S. Application Data

(60) Provisional application No. 60/334,867, filed on Nov. 27, 2001.

(51) Int. Cl.[7] .................................................. H02P 7/36
(52) U.S. Cl. ........................ 318/700; 318/714; 318/432; 318/798
(58) Field of Search ................................ 318/700, 714, 318/715, 717, 721, 722, 654, 655, 85, 437, 438, 136, 729, 139, 798–811, 432, 434; 73/862.08; 323/205, 207

(56) References Cited

U.S. PATENT DOCUMENTS

| | | | | |
|---|---|---|---|---|
| 4,027,216 A | * | 5/1977 | Rozek | 318/718 |
| 5,569,995 A | * | 10/1996 | Kusaka et al. | 318/717 |
| 5,854,547 A | * | 12/1998 | Nakazawa | 318/716 |
| 6,281,656 B1 | * | 8/2001 | Masaki et al. | 318/700 |
| 6,320,349 B1 | * | 11/2001 | Kaneko et al. | 318/798 |
| 6,344,725 B2 | * | 2/2002 | Kaitani et al. | 318/700 |
| 6,501,243 B1 | * | 12/2002 | Kaneko et al. | 318/700 |
| 6,555,988 B2 | * | 4/2003 | Masaki et al. | 318/721 |
| 6,639,377 B2 | * | 10/2003 | Iwaji et al. | 318/700 |

FOREIGN PATENT DOCUMENTS

| | | | |
|---|---|---|---|
| EP | 0 840 441 A1 | 5/1998 | |
| JP | 2000116198 A | * 4/2000 | H02P/21/00 |

OTHER PUBLICATIONS

A.K. Adnanes, W. Sulkowski, L.A. Aga and L. Norum—The Norwegian Institute of Technology, Norway—"A Fully Digital Permanent Magnet Synchronous Motor Drive with Flux Weakening"; in Electrical Machines and Drives, 1991; Fifth International converence on (Conf. Publ. No. 341) Sep. 11–13, 1991, S.227–231.

S. Kunzel, W. Papiemik—Siemens AG Erlangen—"Permanently Excited Main Spindle Drives for Machine Tools with Wide Field Weakening Range", pp. 1–11.

"Control of High-Performance Interior Permanent Magnet Synchronous Drives", Marco Bilewski et al., 8095 IEEE Transactions on Industry Applications, 29(1993) Mar./Apr., No. 2, New York, USA; pp. 328–336.

"A New Flux Weakening Control Algorithm for Interior Permanent Magnet Synchronous Motors", Zhaohui Zeng, E. Zhou, Southeast University, Nanjing, China, pp. 1183–1186.

* cited by examiner

*Primary Examiner*—Rina Duda
*Assistant Examiner*—Eduardo Colon Santana

(57) ABSTRACT

A method of maximizing the power or torque output of a synchronous motor with reluctance effect is disclosed. Bases on torque and voltage set points, in the regulation of the synchronous motor, an optimal torque- and field producing current is generated. The method can further generate an optimal voltage which can maximize the power output of a synchronous motor since changes of inductances generated by the current itself can be accounted for.

4 Claims, 1 Drawing Sheet

METHOD FOR MAXIMIZING POWER OUTPUT IN PERMANENT FIELD SYNCHRONOUS MOTORS

CROSS-REFERENCE TO RELATED APPLICATIONS

This application claims the benefit under 35 U.S.C. §119 (e) of U.S. Provisional Application No. 60/334,867 filed on Nov. 27, 2001 which is herein incorporated by reference.

TECHNICAL FIELD

This invention relates generally to a method of maximizing the power output in synchronous motors in field-oriented operation. In particular, the invention pertains to maximizing the power output in induction motors in field-oriented operation at the ceiling voltage while taking into account the reluctance torque in permanent-field synchronous motors.

BACKGROUND ART

A synchronous machine or synchronous motor employs a permanent magnet as its field system with a variety of voltage and current regulators to control the torque or power response of the motor. The synchronous motor is characterized by having a large magneto motive force per unit volume. The permanent magnet motor is particularly useful for the drive motor of an electric vehicle. Synchronous motors are additionally useful for the generation of an adjustable torque response.

In order to maximize the power or torque of a permanent field synchronous motor, one must consider three different possible operational ranges. There is an optimal operating range for synchronous motors with internal magnets. Taking into consideration the current and voltage limits for different rotational speeds, there are basically three different operating ranges for maximizing the delivered power and torque. The most favorable operating point will be located within all three operating ranges. The first operating range is the required torque being produced with the smallest possible current or the maximum torque with the maximum current. In this operating range, generally in the lowest rotational speed range, only the current limitation plays a role in producing the torque. Therefore, operating points within this operating range would include the point at which the required torque is produced with the smallest possible current or the maximum torque is produced with the maximum current. The second operating range is when the ceiling voltage is reached, with the additional requirement that the possibility for applying the maximum current to the motor still exists. There are two possibilities within this second operating range with the first possibility being that the synchronous motor operates with maximum current and maximum voltage producing the maximum torque, and the second possibility being that the maximum torque is produced before the maximum current is achieved. The third operating range is when the maximum current can no longer be applied.

The ideal operating point should be located within all of the operating ranges. However, there is no currently available method which can consistently place the synchronous motor at this ideal operating point since the current caused changes of the inductances in synchronous motors are not accounted for. Therefore, there is a need for a method that maximizes the power output in synchronous motors, particularly for permanent-field synchronous motors.

SUMMARY OF THE INVENTION

This and other needs are satisfied by the method of the present invention to regulate the torque response of an electric motor or synchronous motor. The present invention is a method for maximizing power output in a synchronous motor, said method comprising the steps of: generating a torque-producing current within said synchronous motor; deriving a field-generating current from said torque-producing current; and deriving an optimal torque-producing current from said torque-producing current and said field-generating current.

In a further embodiment, the present invention is a method for maximizing power output in a synchronous motor, said method comprising the steps of: generating a torque-producing current within said synchronous motor; deriving a field-generating current from said torque-producing current; deriving an optimal torque-producing current from said torque-producing current and said field-generating current; and generating a optimal voltage corresponding to said optimal torque-producing current and using said optimal voltage to control the power output in said synchronous motor.

BRIEF DESCRIPTION OF THE DRAWINGS

The present invention will now be described with reference to the accompanying drawings wherein.

DETAILED DESCRIPTION

Figure 1:
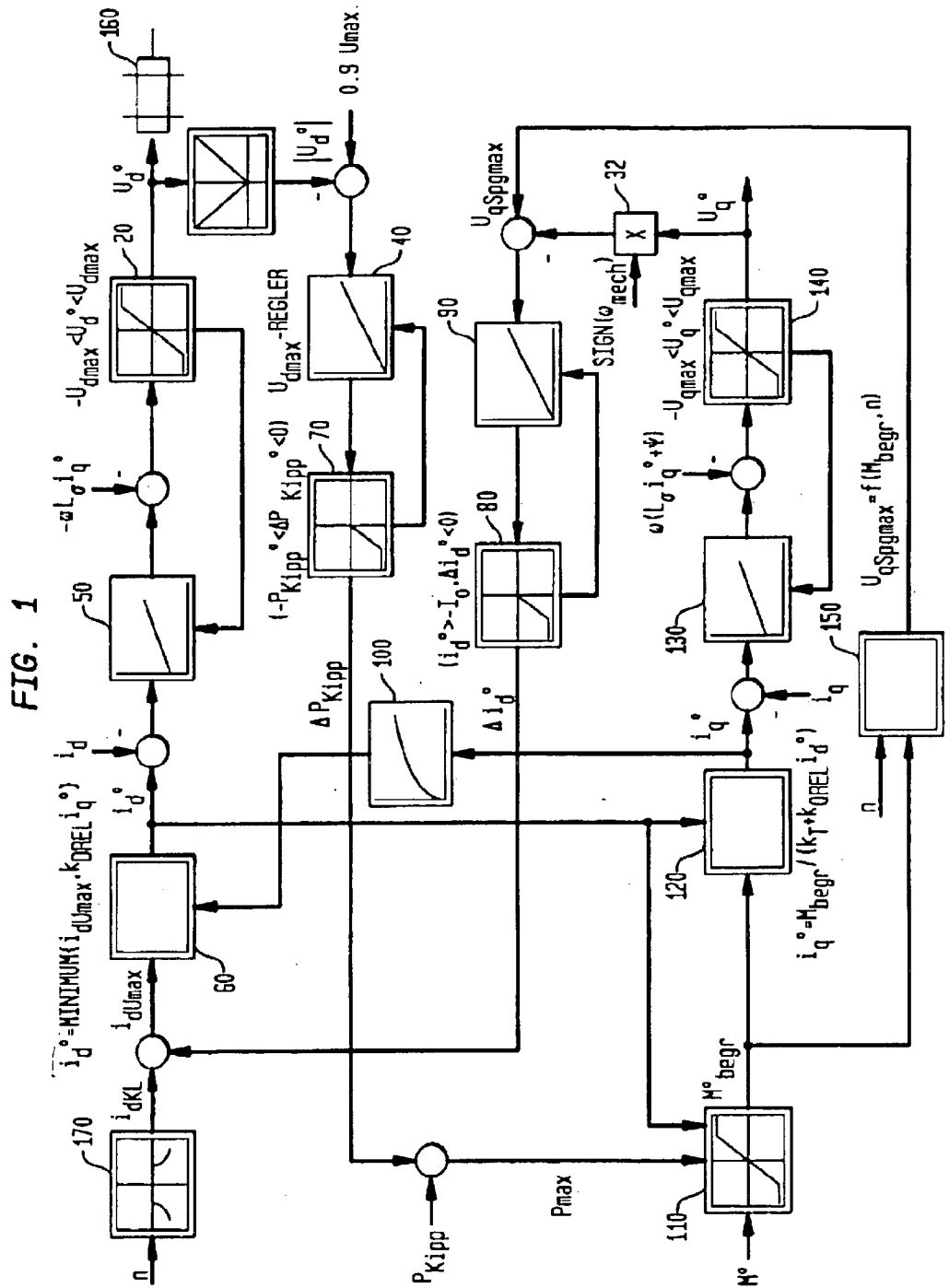
FIG. 1 is a block diagram for the regulation of a synchronous motor in accordance with the principles of the present invention.

As stated above, in permanent field synchronous motors there are three different operating ranges, if current and voltage limits for different rotational speeds are considered. In the lowest rotational speed range, only the current limitation plays a role. This range could include the optimal operating point for which we achieve the required torque with the smallest possible current, or maximum torque with the maximum current. There are three different operating ranges that are needed to maximize the delivered power and torque. In the lowest rotational speed range, only the current limitation plays a role. This range includes the optimal operating point whereby the maximum torque with the smallest possible current or the maximum torque with the maximum current can be realized. The second operating range is characterized by the fact that the ceiling voltage is reached but it is still possible to apply the maximum current to the motor. In this operating range, there are two possibilities that must be distinguished. The first is that operating with maximum current and maximum voltage produces the maximum torque. The second possibility is that the maximum torque is produced before the maximum current is achieved.

The third operating range is when the maximum current can no longer be applied. This range includes an optimal operating point which is identical to the second operating range. The most favorable operating range should ideally be located in all of the three operating ranges. Otherwise, there is the possibility of disruptive changeovers as the operating point moves within the operating ranges. There are additional considerations since the inductance of the motor must also be considered as a function of current. This is the reason that a method based solely on the projection of the current is not suitable and misses the optimal operating point because of variations in current caused inductance.

In prior art solutions to this problem, the reluctance torque has been neglected. As a result, the capabilities of synchronous motors have not been fully utilized. Depending on the type of motor, taking into account the reluctance torque can yield up to 40% greater torque/power.

The field generating current in synchronous motors with reluctance effect can also produce a torque within the motor. Then, the field-generating current can be represented as a fraction of the torque-producing current, and is governed by the following equation:

$$i_d^* = k_D i_q^* \qquad (1)$$

where $$i_d^*$$

is the field-generating current;
$k_D$ is a constant factor of the synchronous motor; and $$i_q^*$$

is the torque-producing current.

It should be noted that $k_D$ is always negative in permanent field spindles. However, in the ceiling voltage operating region, there are situations where the field-generating current must be even more negative because the minimum current is based on the voltage regulator value and the reluctance torque. The factor $k_D$ must also be selected so that for the maximum current, the maximum torque is produced. To find the constant factor $k_D$:

$$\cos(\alpha) = -\frac{k_T}{\sqrt{2}\,6Z_p(L_d - L_q)i_{max}} - \sqrt{\frac{1}{2} + \left(\frac{k_T}{\sqrt{2}\,6Z_p(L_d - L_q)i_{max}}\right)^2} \qquad (2)$$

where $90° \leq \alpha \leq 135°$ and $k_D = \frac{1}{\tan(\alpha)}$ where
$L_d$ is the field inductance; and
$L_q$ is the torque inductance.

Therefore, in the region of smaller torque, the torque does not go along with the minimum current magnitude, although the error is small in that region. In this case, it is more important generally that the maximum possible torque can be reached. In the case that the optimal current for the smaller torque needs to be reached, then $k_D$ must vary as a function of the actual current magnitude (instead of the fixed maximum current $i_{max}$).

The torque-producing fraction of the field-generating current must also be taken into account in calculating the torque-producing current. The torque producing current is governed by the following equation:

$$i_q^* = \frac{M_{lim}}{k_T + k_{QREL} i_d^*} \qquad (3)$$

where $k_{QREL}$ is calculated from motor data as follows: $k_{QREL} = 1.5 Z_p (L_d - L_q)$. For permanent-field spindles with internal magnets, $k_{QREL}$ is negative. Since there is a closed loop equation for calculating between $$i_d^* \text{ and } i_q^*,$$

the optimal operating point cannot immediately be determined but must be adjusted by an iterative procedure.

In order to insure a stable solution, feedback smoothing is necessary. Therefore, the two components of current must be adjusted as follows. First, the calculation of torque-producing current from the torque set point is made. After smoothing the feedback from the current, this current leads to a field-generating current since the relationship introduced in Equation (1) still holds. From $i^*_d$, again the calculation of both the current limits for $i^*_d$ as well as for $i^*_q$ itself are calculated (in the next cycle), so that the torque producing current must be decreased. This again leads to a changed field-generating current until the process eventually oscillates. This iterative procedure is repeated until a stable solution is achieved.

There is an alternative embodiment which features a non-iterative method. In this embodiment, the current magnitude is calculated from the torque set point. The optimal resolution into field-generating and torque-producing current then occurs by calculating the angle $\alpha$ from Equation (2). Then, from the calculation of $\alpha$, the following equations can determine $$i_d^* \text{ and } i_q^*:$$

$$i_d^* = |i|\cos(\alpha) \text{ and, } i_q^* = |i|\sin(\alpha) \qquad (4)$$

Next, there is a check for whether the field-generating current of the maximum voltage regulator is smaller (i.e. more negative) than the component current determined in this way. If that is the case, then the maximum voltage regulator value is assumed and the torque-producing current must, if necessary, be limited once again based on the current limits, where:

$$|i_q^*| \leq \sqrt{i_{max}^2 - i_d^2} \qquad (5)$$

Both maximum voltage regulators operate as in the method, without reluctance torque except that the absolute value is not represented in the voltage Uqmax ator, because here it has to be possible for the sign to change compare with the electromotive force. For that reason, only the sign due to the direction of rotation is compensated with a change in the sign. Therefore, for positive rotational speed, negative values for the voltage $U^*_q$ can also be set.

The voltage set point for maximum torque $U_{qspgmax}$ must be calculated differently. The specifications must be rotational speed and torque dependent and they must result in finding the maximum torque even with the current limitations. For this purpose, the torque is calculated assuming that the maximum voltage is achieved. In order to keep the calculation simple, the voltage drop due to resistance is neglected and only the steady-state contributions are taken into account. Then the torque can be calculated as follows:

$$M = \frac{3}{2} Z_p \cdot \Psi \cdot i_q + \frac{3}{2} Z_p \cdot (L_d - L_q) \cdot i_d \cdot i_q \quad (5)$$

$$\text{where } \frac{k_T}{\sqrt{2}} = \frac{3}{2} Z_p \cdot \Psi \text{ with}$$

$$U_d = -\omega \cdot L_q \cdot i_q$$

$$U_q = \omega \cdot L_d \cdot i_d + \omega \cdot \Psi$$

$$U_d = \pm \sqrt{U_{max}^2 - U_q^2}$$

resulting in $$M = \pm \frac{\frac{3}{2} Z_p}{\omega} \sqrt{U_{max}^2 - U_q^2} \left[ \frac{U_q(L_d - L_q)}{\omega L_d L_q} + \frac{\Psi}{L_d} \right] \text{ (for motor operation)}$$

(for motor operation)

From the above equation, one can use differential calculus to determine the maximum torque at the ceiling voltage, $M_{breakdown}$, from the above equation. The torque at the ceiling voltage is set when the voltage $U_{qmin}$ is set. However this torque can only be set when the current required is less than $i_{max}$. The resultant equation cannot be solved in closed form with respect to $U_q$. If therefore, one calculates $U_q$ as a function of torque, then at the same time one has the smallest current for this operating point. In order to further drop the ceiling voltage, one must actually apply more negative (that is, larger in magnitude) field-generating currents, in order to create a voltage reserve. In order to nevertheless determine the optimal $U_q$ (ceiling voltage secondary condition), one now has two options:

(1) Work with an approximation. One possibility would be for example:

$$U_{q\,min} = -\frac{\omega \Psi L_q}{4(L_d - L_q)} - \sqrt{\frac{U_{max}^2}{2} + \left( \frac{\omega \Psi L_q}{4(L_d - L_q)} \right)^2}$$

$$M_{breakdown} = M(U_{q\,min})$$

$$U_{qSpg\,max} \approx U_{max} \sqrt{1 - \left( \frac{M_{lim}^*}{M_{breakdown}} \right)^2} + \left( \frac{M_{lim}^2}{M_{breakdown}} \right) U_{q\,min}$$

(2) The other possibility would be to determine a solution by an iterative procedure. For example, according to the equation:

$$U_{qSpg\,max}(k+1) = U_{qSpg\,max}(k) + \frac{M_{lim}^* - M[U_{qSpg\,max}(k)]}{\frac{dM[U_{qSpg\,max}(k)]}{dU_{qSpg\,max}}}$$

where $U_{qmin} \leq U_{qSpgmax} \leq U_{max}$
with the starting value $U_{qSpgmax}(0) = U_{max}$ As can be seen in the formula for $U_{qmin}$, the inductances appear as a ratio. If one assumes that saturation decreases the inductances $L_d$ and $L_q$ by approximately the same factor, then the result nevertheless remains optimal because the factor is reduced. At the same time, a high enough breakdown power limit must be selected (i.e. in the determination, this limit must come from the saturated inductances or a corresponding factor must be provided as a ratio. An overly high power breakdown limit should also be selected because the voltage regulator corrects any errors that may appear, also taking into account the saturation, provided that the current limiting does not engage too soon (i.e. before the voltage regulator). Therefore, there is extensive independence relative to the inductances. This is the advantage that the voltage based specifications for the current components have over direct specifications for the current.

The torque/power maximum is determined with the above illustrated embodiments. For the lowest rotational speed range, the current limit is reached before the ceiling voltage. Here, the maximum power torque is achieved with the field-generating current calculated from Equation (1). The calculation for the $U_{qSpgmax}$ yields values that are close to $U_{max}$. The maximum voltage regulator also must absolutely not engage. In the next rotational speed range, (where the ceiling voltage is achieved), the maximum torque is achieved if the current and voltage limits are reached at the same time. Since the formula for $U_{qSpgmax}$ ensures that one is at the voltage limit, the optimal state is determined. At the same time, from a certain rotational speed, running with the maximum current and voltage would lead to the field-generating current predominating, and therefore the torque producing current must be reduced below the optimal value. Here, the optimum value is achieved with the voltage $U_{qmin}$. This is the value that is set for the torque $M_{breakdown}$.

The principles of the present invention set forth herein are illustrated with respect to FIG. 1, which is a block diagram for the regulation of a synchronous motor. The signal flow between the individual blocks is symbolized by lines with arrows.

With continuing reference to FIG. 1, there is shown a block diagram for the regulation circuit of a synchronous motor 160. The regulating circuit 10 of the present invention comprises current scan 170, voltage regulators 40, 90, current regulators 50, 130, minimizing processor 60, limiters 20, 70, 80, 140, absolute value processor 30, feedback smoother 100, and arithmetic processors 110, 120. The field producing current $i_{dumax}$ and also the current $i_{dre1}$ is injected to a minimizing processor 60 so that the field-generating current is calculated from the minimizing processor 60. The current regulator 50 and arithmetic processor 120 are adapted for feedback and iterative calculation of the field producing current for control of the synchronous motor SM. The iterative feedback loop begins with the absolute value processor 30 which outputs the absolute value of the field component voltage. The current, torque and power are further limited through the limiters 70 and 110. The processor 120 is coupled to the feedback smoother 100 for iterative feedback. The processor 150 is coupled to voltage regulator 90 and limiter 80 for injection back to the initial field-producing current $i_{dumax}$. Current regulator 130 and limiter 140 are additionally coupled to inject back to the initial field-producing current $i_{dumax}$. It will be understood that the components of the regulating circuit 10 can be built by conventional means well known to those of ordinary skill in the art.

The above described embodiments are merely exemplary. Those of ordinary skill in the art may readily devise their own implementations that incorporate the principles of the present invention and fall within the spirit and scope thereof.

What is claimed is:

1. A method for maximizing power output in a synchronous motor, said method comprising the steps of:

generating a torque-producing current within said synchronous motor being optimal with respect to torque and power generation;

deriving a field-generating current from said torque-producing current;

deriving an optimal torque-producing current from said torque-producing current and said field-generating current;

generating an optimal voltage corresponding to said optimal torque-producing current; and using said optimal voltage to control the power output in said synchronous motor.

2. The method of claim 1, wherein said optimal torque and field producing current is derived through iterative feedback.

3. The method of claim 1, wherein said field-generating current is derived directly from the inductances of said synchronous motor.

4. The method of claim 1, further comprising:

calculating a torque set point;

calculating a voltage set point corresponding to said torque set point;

deriving an optimal field-generating current and a torque-producing current based on torque and voltage set points for regulating said synchronous motor.

* * * * *